United States Patent [19]

Johnson et al.

[11] Patent Number: 4,623,929
[45] Date of Patent: Nov. 18, 1986

[54] FLASH TUBE SIMMER CIRCUITRY FOR A FILM VIDEO PLAYER ELECTRONIC STROBE LIGHT

[75] Inventors: David A. Johnson; Richard A. Shroyer, both of Rochester, N.Y.

[73] Assignee: Eastman Kodak Company, Rochester, N.Y.

[21] Appl. No.: 730,029

[22] Filed: May 3, 1985

[51] Int. Cl.$^4$ .................. H04N 3/36; H05B 41/14
[52] U.S. Cl. ............................... 358/214; 315/101; 315/107; 315/241 S
[58] Field of Search ................... 358/214, 44, 54; 355/69; 315/101, 107, 241 S; 354/145.1

[56] References Cited

U.S. PATENT DOCUMENTS

| 4,158,793 | 6/1979 | Lewis | 315/101 |
| 4,495,516 | 1/1985 | Moore et al. | 358/54 |
| 4,506,300 | 3/1985 | Fearnside | 358/214 |

FOREIGN PATENT DOCUMENTS

85/04778 10/1985 World Int. Prop. O. .......... 358/214

Primary Examiner—L. T. Hix
Assistant Examiner—D. Rutledge
Attorney, Agent, or Firm—Dennis P. Monteith

[57] ABSTRACT

A film video player includes an electronic strobe light operable for repetitively firing a flash tube, to flash illuminate a solid state image sensor via a high-intensity light pulse projected onto photographic film at the vertical retrace rate of a standard television signal. A current sink circuit is provided for drawing a flash tube simmer current, to maintain an arc in the flash tube between sensor-illuminating pulses. Sensing circuitry, coupled to a junction common to the flash tube and the current sink circuit, produces a control signal corresponding to whether or not the flash tube is conducting simmer current. Switching circuitry, responsive to the control signal at the vertical retrace rate, (1) causes the overriding of the operation of a flash tube trigger circuit when the control signal indicates that the flash tube is conducting simmer current, and (2) causes the operating of the trigger circuit when the control signal indicates that the flash tube is not conducting simmer current. By providing for the triggering of the flash tube only when the simmer current is off, electromagnetic interference, which is produced by the flash tube trigger voltage and which can adversely affect the video display signal, is minimized.

8 Claims, 6 Drawing Figures

FLASH TUBE SIMMER CIRCUITRY FOR A FILM VIDEO PLAYER ELECTRONIC STROBE LIGHT

CROSS-REFERENCE TO A RELATED APPLICATION

Reference is hereby made to U.S. Patent Application Ser. No. 596,868, entitled FILM VIDEO PLAYER WITH ELECTRONIC STROBE LIGHT by D. Kaiser et al, filed on Apr. 4, 1984.

BACKGROUND OF THE INVENTION

1. Field of the Invention

The present invention relates to an illumination system for use as part of a film video player. More particularly, the invention relates to flash tube simmer circuitry for an electronic strobe light of the video player.

2. Description Relative To The Background Art

U.S. Pat. No. 4,495,516, which is assigned to the assignee of the present invention, discloses a film video player for displaying on a video monitor color images recorded on color negative photographic film. The film video player includes a pulsed light source for illuminating a CCD image sensor via a pulse of high-intensity light projected onto the photographic negative at the vertical retrace rate of a standard television signal. Photosignals are read out in the dark to avoid smearing the image signal produced by the CCD. The pulsed light source comprises a quartz halogen projection lamp, the light output of which is chopped by a spinning shutter disc. Although the light source produces very adequate illumination with excellent pulse-to-pulse uniformity and constant color temperature, the chopped light source is mechanically complex and consumes a considerable amount of energy, requiring substantial cooling.

U.S. Pat. No. 4,495,516 further discloses that the pulsed light source may comprise an electronic strobe light such as a Xenon flash. A film video player with an electronic strobe flash light provides several advantages over a film video player having a quartz halogen projection lamp with a mechanical shutter. In particular, the strobe light provides reduced mechanical complexity and lower power consumption, resulting in lower heat generation and consequently reduced cooling requirements, and better color temperature stability over the life of the light source.

A film video player having a conventional electronic strobe light as the pulsed light source, produces a television signal having an annoying flicker. A measure of the flicker produced from a number of flash tubes powered with a conventional strobe light circuit indicates that the average flash-to-flash variation in light output is on the order of one stop (0.3 log E).

The aforementioned copending U.S. patent application U.S. Ser. No. 596,868, filed Apr. 4, 1984, discloses and claims a film video player having a high-voltage power supply which produces a substantially constant flash-firing current for each flash-producing operation. To achieve that result, the electronic strobe light includes a conventional flash trigger circuit, operable at the video field rate, for producing a high voltage trigger electrode pulse, which ionizes at least a portion of the gas in the flash tube. A high-voltage power supply, in response to each triggering operation of the flash tube, supplies a relatively short high-voltage pulse greater than the minimum ignition voltage of the flash tube, to ignite a flash tube arc. A regulated low-voltage power supply, in response to the high-voltage supply, then applies a voltage to the flash tube that is less than the minimum ignition voltage, but which is adequate to produce a pulse of light if an arc of the flash tube is already ignited. By producing the bulk of the light pulse with a voltage which is lower than the minimum ignition voltage of the flash tube, the amount of power that is consumed to fire the strobe light is significantly reduced.

Although the circuitry of the above mentioned patent application has been found to work well for its intended purpose, it is noted that the high voltage trigger electrode pulse produces a level of electromagnetic interference that has the potential for degrading the performance of the film video player. A further potential problem is that the flash tube is subjected to a thermal shock each time its arc is restarted during the triggering operation. It is believed that repeatedly subjecting the flash tube to a thermal shock at the video field rate (60 Hz) may limit the operational life of the flash tube. Additionally, it has been found that repeated triggering of the flash tube produces an audible signal at the 60 Hz video field rate which contributes to the overall noise related to the operation of the video player.

It is known in the electronic flash art to provide simmer circuitry which functions, after a flash tube is fired initially, to draw only a limited amount of current through the flash tube, to maintain an arc. Thus, when subsequent flashes are required, it is not necessary to apply a trigger electrode pulse. In an electronic strobe light for a film video player, simmer circuitry would serve advantageously to limit electromagnetic interference, possibly extend the useful life of the flash tube, and eliminate audible signals at the flash firing frequency.

For a film video player having a solid state image sensor, the simmer circuitry must operate to limit the current through the flash tube so that, at most, only a very slight amount of light is produced, to avoid during read out the smearing of the image signal produced by the image sensor. The simmer current, on the other hand, must be adequate to maintain an arc. As these two requirements conflict, severe limits are placed on a permissible level of simmer current.

With regard to a film video player including an electronic strobe light having simmer circuitry, it has been found through laboratory testing, that the arc of the flash tube extinguishes on a random basis. It is not known precisely why this occurs. Because of the random nature of the problem, it is believed to be caused by a variety of probalistic factors, which, under certain operating conditions, combine in a way that causes the extinguishing of the arc. Thus, it has not been possible to reliably provide an appropriate simmer current, and thereby reliably provide repeated flash pulses without a continuous flash tube triggering operation at the flash-firing rate.

SUMMARY OF THE INVENTION

In view of the foregoing, it is an object of the invention to overcome the aforementioned simmer current reliability problem and, in so doing, provide an electronic strobe light for a film video player that reliably fires, without requiring a continuous triggering operation. This object is achieved for an electronic strobe light for a film video player having circuit means, which is responsive to an electrical signal that is functionally related to whether or not a simmer current is present, for restricting the triggering of the flash tube to flash operations in which the arc of the flash tube is extinguished. Because the triggering of the strobe light does not occur when an arc is otherwise present, electromagnetic interference is reduced, tube life may be prolonged, and an audible trigger-related signal is eliminated.

In a preferred embodiment, the electronic strobe light includes trigger circuitry, operable for repetitively triggering a flash tube into conduction, for flash illuminating a solid state image sensor via a pulse of high-intensity light projected onto a photographic film at the vertical retrace rate of a standard television signal. In accordance with the invention, the circuit means includes a circuit for drawing a simmer current through the flash tube, to maintain an arc in the flash tube between sensor-illuminating pulses, sensing circuitry for producing a control signal corresponding to whether or not the flash tube is conducting simmer current, and switching circuitry, responsive to the control signal at the vertical retrace rate, (1) for causing the overriding of the operation of the trigger circuitry when the control signal indicates that the flash tube is conducting simmer current, and (2) for causing the operation of the trigger circuitry when the control signal indicates that the flash tube is not conducting simmer current.

Preferably, the electronic strobe light includes a high-voltage power supply having a first voltage supply for providing a first voltage, which is greater than the minimum ignition voltage of the flash tube, for re-igniting the arc of the flash tube when its gas is at least partially ionized by the trigger circuitry, and a second voltage supply for providing a second voltage, which is less than the minimum ignition voltage of the tube, but which is adequate, when an arc is present, for causing the flash tube to produce a light pulse. When simmer current is present, the switching circuitry causes only the second voltage supply to apply firing power to the flash tube, thereby further reducing the electromagnetic interference.

The invention and its other advantages will become more apparent in the detailed description of a preferred embodiment presented below.

DESCRIPTION OF THE DRAWINGS

The invention will be described with reference to the accompanying drawings, wherein.

DETAILED DESCRIPTION OF A PREFERRED EMBODIMENT

Figure 1:
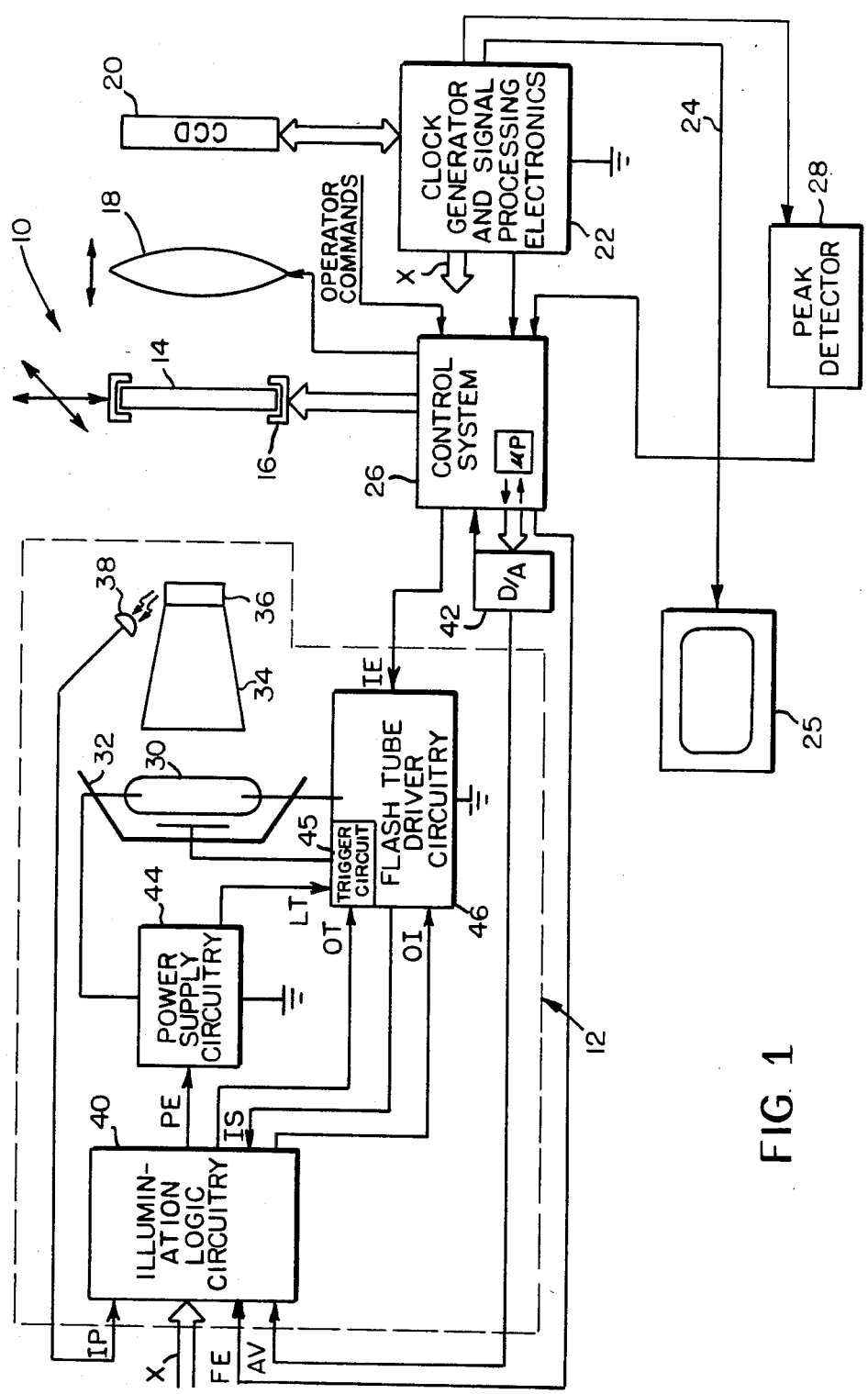
FIG. 1 is a schematic of a film video player having an electronic strobe light according to the present invention.

FIG. 1 shows a film video player 10 having an electronic strobe light, designated generally 12, according to the present invention. The strobe light 12 serves to periodically illuminate a color negative photographic film 14 located in a movable film gate 16. A zoom lens 18 projects an image of the illuminated film 14 onto a solid state charge coupled device (CCD) image sensor 20. Clock generator and signal processing electronics 22 serve to control the CCD sensor 20 and to process its output signals, to produce in a known manner, at output 24, a video signal corresponding to the film image, for displaying the image on a video monitor 25 such as a standard television.

The solid state CCD image sensor is of the type wherein photosignals are produced directly in charge transfer registers (not shown). To maximize the area available for photosensing, no light shielded frame storage area is provided on the sensor, thereby requiring that the sensor be flash exposed and read out in the dark. The image sensor 20 is exposed by the strobe light 12 during the vertical retrace intervals of the standard television signal, and is read out in the dark at the standard video rate.

A microprocessor-based control system 26, in response to commands from an operator, functions (1) to move the film gate 16 laterally and vertically for cropping the image, and (2) to move the zoom lens 18 for magnifying and minifying the projected image. The control system 26 also serves to control the firing of the electronic strobe light 12. To that end, the control system 26, under the control of its microprocessor, provides to the strobe light 12 a flash enable signal, FE, and a simmer enable signal, IE. For the purpose of regulating the light output of the strobe light 12, a peak detector 28, responsive to an output of the signal processing electronics 22, provides a digital signal to the control system 26 corresponding to the amplitude of the video signal.

The electronic strobe light 12 includes a Xenon flash tube 30 positioned adjacent a reflector 32 arranged for directing light from the flash tube onto a light integrator 34, which is formed of a solid bar of transparent material. A diffuser 36 at the output of the integrator 34 functions to spread the light so that there are no illumination discontinuities over the film plane, as such discontinuities may result in either light or dark "bands" being visible on the video monitor 25. The diffuser 36 also serves to suppress the effects of minor scratches and blemishes on the film 14.

A photosensor 38, such as a photodiode, produces a light-dependent signal, IP, corresponding to the intensity of light from the flash tube 30. For that purpose, the photosensor 38 is positioned to receive light reflected from the surface of the diffuser 36. Because light reflected from the film 14 varies from negative to negative, the photosensor 38 should be located or its viewing angle restricted so that light reflected from the film does not impinge on the photosensor.

Illumination logic circuitry 40 serves to control the electronic strobe light 12 so that a desired amount of flash illumination is produced during each vertical retrace interval. To synchronize the firing of the flash pulses, the clock generator and signal processing electronics 22 apply video synchronization signals, generally denoted X, to the illumination logic circuitry 40.

For the purpose of controlling the amount of illumination produced for each flash pulse, the illumination logic circuitry 40 receives the light-dependent signal IP from the photosensor 38, and an exposure level reference voltage, AV, from the control system 26. The reference voltage AV corresponds to a desired amount of light output from the flash tube 30, and is produced under the control of the microprocessor of the control system 26 by comparing the output of the detector 28 with a predetermined reference value. The voltage AV is actually supplied to the illumination logic circuitry 40 through a digital-to-analog converter 42 coupled to output data pins of the microprocessor.

Power supply circuitry 44, under the control of a power supply enable signal, PE, supplied by the illumination logic circuitry 40, applies high voltage flash-firing power to the flash tube 30, to produce the flash pulses. Additionally, power supply circuitry 44 serves to provide operating voltage, LT, to a flash tube trigger circuit portion 45 of flash tube driver circuitry 46.

As is known in the electronic strobe light art, a flash tube trigger circuit functions to apply a high voltage triggering pulse to the trigger electrode of a flash tube, the triggering pulse serving to initially ionize at least a portion of the gas in the flash tube. For the purpose of synchronizing the operation of the trigger circuit 45 with the vertical retrace intervals, the trigger circuit 45 receives a flash tube trigger signal, OT, from the illumination logic circuitry 40.

In addition to providing the flash tube trigger circuit 45, flash tube driver circuitry 46 serves to control the duration of the flash pulses in accordance with the exposure level reference voltage AV. For that purpose, the flash tube driver circuitry 46, in response to a flash-firing control signal, OI, supplied by the illumination logic circuitry 40, provides a path to ground for flash-firing current applied to the flash tube 30 by power supply circuitry 44.

The relatively high voltage pulse, which is required to trigger an electronic strobe light, can produce electromagnetic interference. For an electronic strobe light for use with a film video player, such intereference can adversely affect the video display. Accordingly, it is desired in the operating of the electronic strobe light 12 of the film video player 10 that electromagnetic interference is maintained at as low a level as is reasonably possible.

Figure 2:
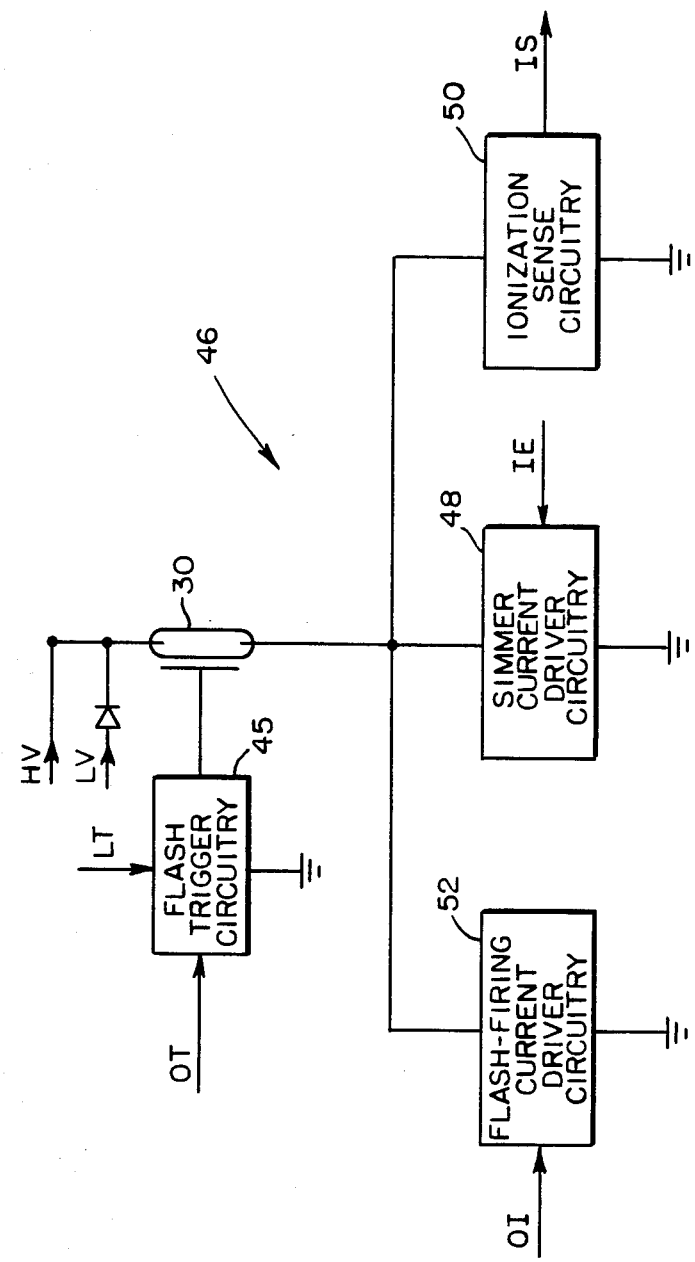
FIG. 2 is a block diagram of a flash tube driver circuitry portion of the electronic strobe light.

As shown in FIG. 2, the flash tube driver circuitry 46 further includes simmer current driver circuitry 48 for drawing a flash tube simmer current, to sustain a low-level arc in the flash tube 30 during intervals between flash illuminating pulses. For that purpose, the circuitry 48 limits the simmer current to a given magnitude that produces an arc which is insufficient to cause a smearing of the recorded image during read out of the image sensor 20.

With a simmer current, there is no need to produce a triggering pulse to trigger the flash tube into conduction each time a flash pulse is to be produced. As described with regard to the background art for a film video player having a solid state image sensor, it has not been possible, however, to maintain a continuous simmer current of a magnitude that keeps the arc of the flash tube at a low enough level to avoid the smearing of the image signal during read out of the image sensor.

To overcome this simmer current reliability problem, the invention requires means for determining whether or not flash tube simmer current is flowing. For that purpose, the flash tube driver circuitry 46 includes ionization sense circuitry 50, serially connected to the flash tube 30, in parallel with the simmer current driver circuitry 48 and flash-firing current driver circuitry 52. The ionization sense circuitry 50 serves to sense whether or not an arc is present in the flash tube 30, and to provide an output that indicates the state of the arc. To that end, the ionization sense circuitry 50 provides at its output a logic level voltage, IS, the voltage IS being high when the arc exists, i.e. simmer current is flowing, and being low when the arc is extinguished.

The flash-firing current driver circuitry 52, under the control of the flash-firing signal OI, serves to regulate the flash-firing current delivered to the flash tube 30 when the electronic strobe light 12 is illuminating the film 14. For that purpose, the circuitry 52 regulates both the duration and the amplitude of the firing current through the flash tube 30, to minimize light output variations from flash to flash.

Figure 3:
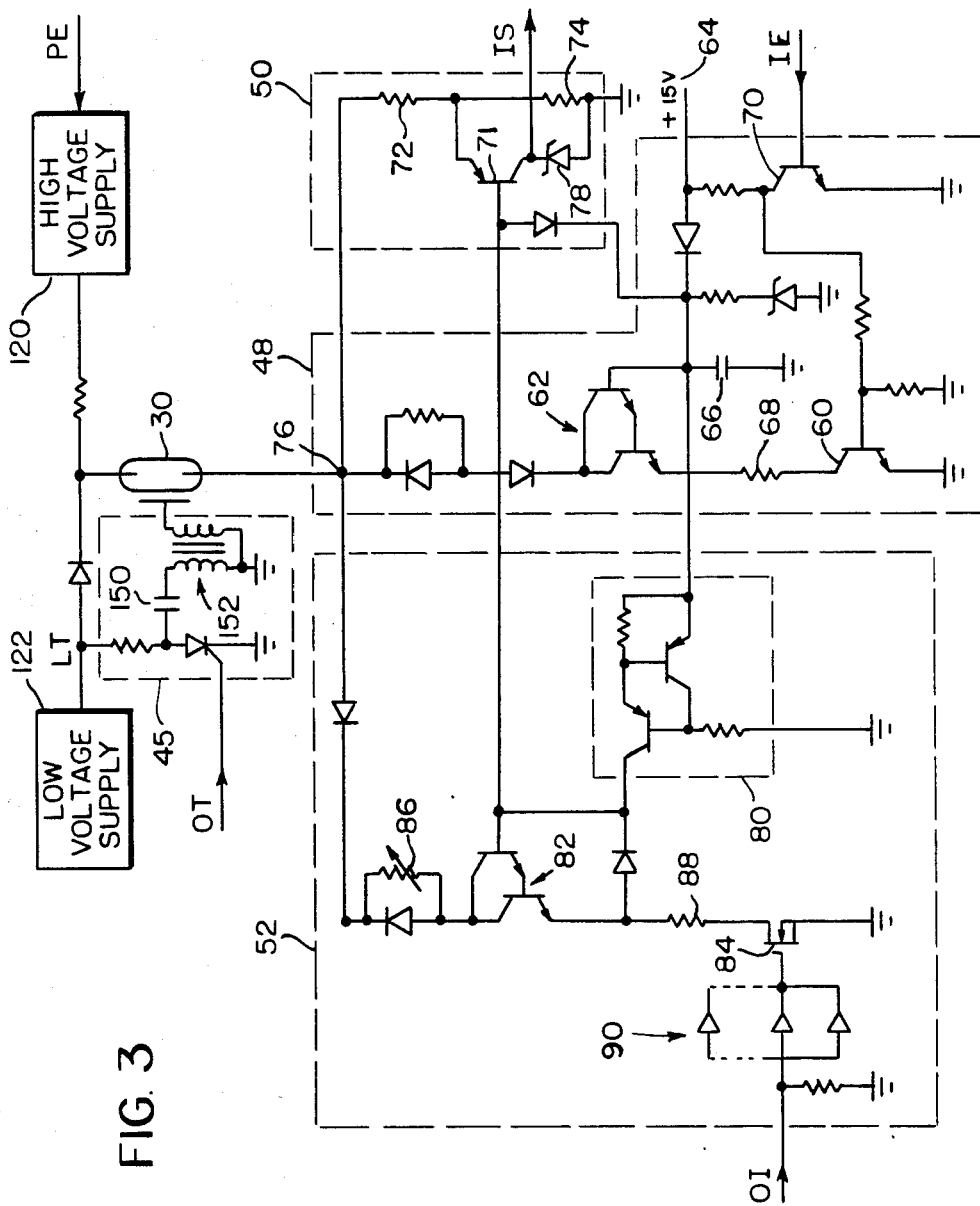
FIG. 3 is a schematic circuit diagram of the flash tube driver circuitry of FIG. 2.

The flash tube driver circuitry 46 is shown in greater detail in FIG. 3. The simmer current driver circuitry 48 is arranged to draw approximately 125 milliamperes (ma) of current from the flash tube 30 through an NPN transistor 60 to ground. For that purpose, a base drive current is supplied to a Darlington stage 62 from a 15-volt source 64. A snubber capacitor 66 serves to limit voltage fluctuations of the source 64 at the input of the Darlington stage 62, so that the voltage at its output is clamped at about 15 volts minus three diode voltage drops (1.8 volts). The 15-volt source 64 also serves to drive the transistor 60 into saturation. The 125-ma current of the simmer current driver circuitry 48 is controlled by a serially connected resistor 68, as the simmer current is limited by the voltage at the output of the Darlington stage 62 minus the saturation voltage of the transistor 60, divided by the value of the resistor 68.

A transistor 70, which is responsive to the simmer enable signal IE supplied by the control system 26, functions to turn the transistor 60 off. The transistor 70 serves to prevent the simmer current driver circuitry 48 from drawing current during periods when the film video player 10 is not being utilized.

The ionization sense circuitry 50 includes a PNP transistor 71 which is arranged to conduct so long as at least a simmer current flows through the flash tube 30. For that purpose, a pair of serially connected resistors 72 and 74 form a voltage divider between the flash tube 30 and ground. Whenever the flash tube 30 has an arc, the voltage at the junction 76 between the flash tube and the voltage divider is sufficient to turn the transistor 71 on. A zener diode 78 provides the logic level one voltage IS when the transistor 71 conducts, and the logic level zero voltage IS when the transistor 71 is off.

The flash-firing current driver circuitry 52 is arranged to draw ten amperes of current through the flash tube 30 to ground during a flash-producing operation. Current-limiting circuitry 80 serves to limit the amount of base drive current that the 15-volt source 64 supplies to a Darlington stage 82. By limiting the drive current, the Darlington stage 82 is protected against excessive loading. With this arrangement, the voltage at the output of the Darlington stage 82 can be clamped at a given level of approximately 15 volts minus about four diode voltage drops.

An N-channel power MOSFET 84 connects the flash tube 30 to ground through a variable, power-dissipating resistor 86 serially connected to the Darlington stage 82 and a current-setting resistor 88. A bank of parallel connected CMOS buffers 90, responsive to the control signal OI supplied by the illumination logic circuitry 40, provides fast turn on and turn off of the MOSFET 84. The resistor 88 serves to establish the current through the circuitry 52 at the aforementioned ten amperes, as that current is determined by the output voltage of the Darlington stage 82 minus the voltage across the MOSFET 84, divided by the value of the resistor 88. The resistor 86 serves to reduce the voltage across the Darlington stage 82, to limit the amount of power that is dissipated in the Darlington.

The invention also requires that the electronic strobe light 12 of the film video player 10 be reliably fired, without subjecting the flash tube 30 to a continuous triggering operation at the vertical retrace rate. For that purpose, the illumination logic circuitry 40 serves to provide the aforementioned flash tube trigger signal OT to the trigger circuit 45 only when the arc of the flash tube 30 is extinguished. To this end, the clock generating and signal processing electronics 22 of FIG. 1 supply the video synchronization signals X to the illumination logic circuitry 40. Those synchronization signals include (1) a power supply clock signal, PC, and (2) a trigger control signal, FT. The clock signal PC, which is normally high, goes low momentarily, approximately 500 microseconds ($\mu s$) prior to the end of each vertical field. The trigger control signal FT goes from a low condition to a high condition at the beginning of each vertical retrace interval, and remains high for about 1.133 milliseconds.

Figure 4:
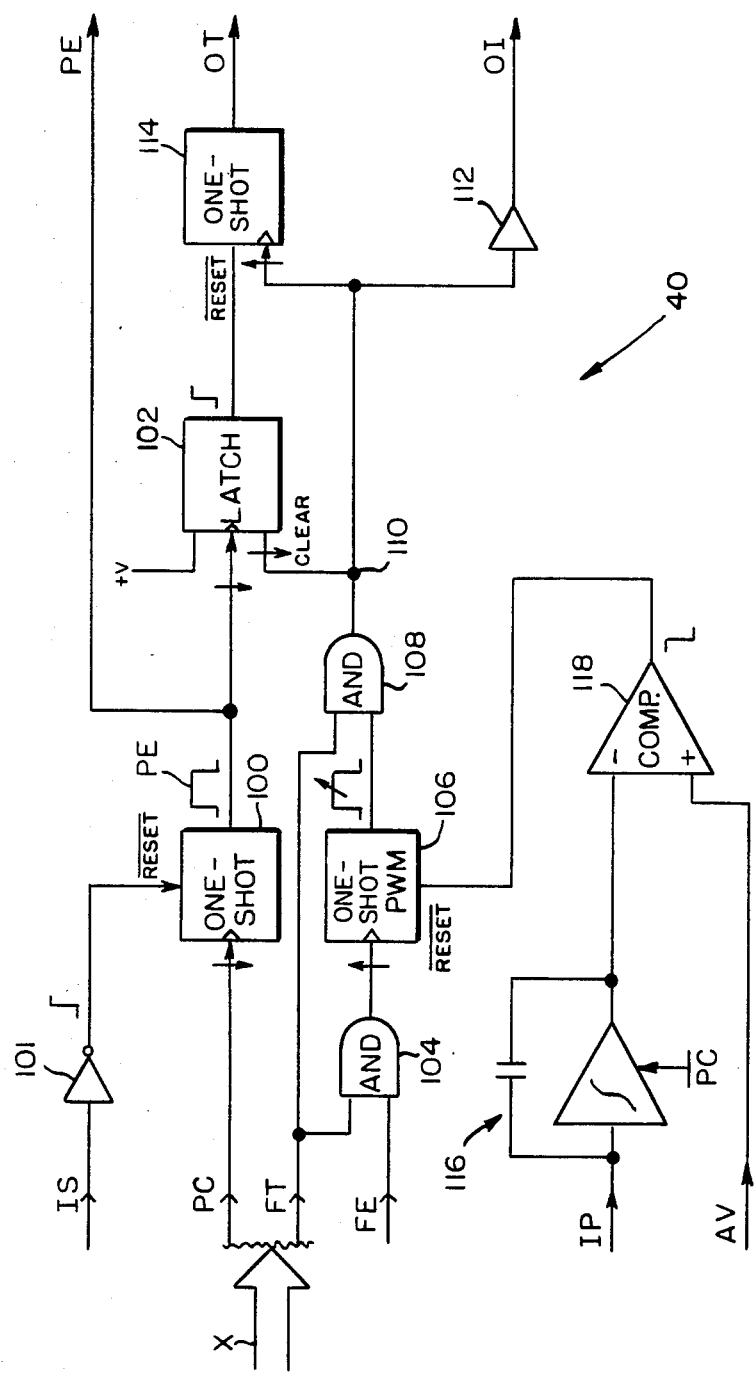
FIG. 4 is a block diagram of an illumination logic circuitry portion of the electronic strobe light.

As shown in FIG. 4, the illumination logic circuitry 40 includes a monostable multivibrator (one-shot) 100 which, under timing provided by the negative-going transition of the clock signal PC, produces the power supply enable signal PE. The signal PE has a fixed duration of approximately 375 $\mu s$.

The operating of the one-shot 100 is controlled by the output of an inverter 101, which receives the logic level voltage IS. The inverter 101 serves to enable the one-shot 100 for operation in response to the signal PC only when the voltage IS indicates that simmer current is off. In so doing, because of the timing provided by the clock signal PC, when the simmer current is off, the power supply enable signal PE undergoes its negative-going transition prior to the end of a video field.

A latch 102, which receives the output of the one-shot 100, serves to produce a logic level one output in response to the negative-going transition of the power supply enable signal PE.

A dual-input AND gate 104 of the logic illumination circuitry 40 receives the trigger control signal FT from the clock generating and signal processing electronics 22, and the flash enable signal FE from the control system 26. Thus, the AND gate 104 serves to provide a logic level one output during each vertical retrace interval that a flash pulse is to be produced.

A resettable one-shot 106 produces an output pulse in response to a positive-going transition of the output of the AND gate 104. The one-shot 106 functions as a pulse width modulator (PWM) which serves to produce a variable width output pulse, during each vertical retrace interval that a flash pulse is required. The width of each pulse corresponds to the duration of a desired pulse of flash illumination. Because the film 14 must be illuminated during the vertical retrace interval, the one-shot 106 is arranged so that the maximum width of its output pulse is limited to 1.133 milliseconds (ms). That time is slightly less than a full vertical retrace interval, to allow time for the light output of the flash tube 30 to decay prior to the end of each retrace interval An AND gate 108 receives the output of the one-shot 106, and provides at the junction 110 a logic level one output so long as the output of the one-shot 106 remains high while FT is high or vice versa. The AND gate 108 serves three functions. First, the gate 108 functions, under timing provided by the positive-going transition of its output, to drive a resettable one-shot 114. Second, the gate 108 causes an output buffer 112 to provide the aforementioned flash-firing control signal OI. Third, the gate 108 serves to clear the latch 102 when the output pulse of the one-shot 106 is terminated or FT goes low. That is, the output of the latch 102 is reset at a logic level zero condition in response to a negative-going transition of the output of the AND gate 108.

The one-shot 114 provides at its output the flash tube trigger pulse OT, which is a fixed pulse of approximately 30 $\mu s$. The operation of the one-shot 114 is controlled by the output of the latch 102. In so doing, the one-shot 114 provides its 30 $\mu s$ trigger pulse OT in response to a positive-going transition at the output of gate 108, only when the output of the latch 102 is high. Thus, the one-shot 114 is timed to provide the flash trigger pulse OT after a negative-going transition of the power supply enable pulse PE.

The pulse width of the output of the one-shot 106 is normally controlled by an integrator 116 and a comparator 118. The signal FT limits the maximum length of the pulse at the output of the gate 108. The one-shot 106, however, will go low no later than 1.133 ms, thereby causing the output of 108 to go low should the signal FT fail to go low.

The integrator 116 receives the light-dependent signal IP from the photosensor 38, and produces an output corresponding to a cumulative amount of light impinging on the photosensor. Immediately prior to each vertical retrace interval, the output of the integrator 116 is set to zero by the negative-going transition of the signal PC.

The comparator 118 receives as inputs the exposure level signal AV, and the integrated signal from the output of the integrator 116, and produces a flash control signal which is high whenever the integrated signal is less than the signal AV, and which is low when the integrated signal is greater than the exposure level signal. The output pulse of the one-shot 106 is terminated when the output of the comparator 118 assumes a low condition or when the one-shot 106 times out at 1.133 ms.

Figure 5:
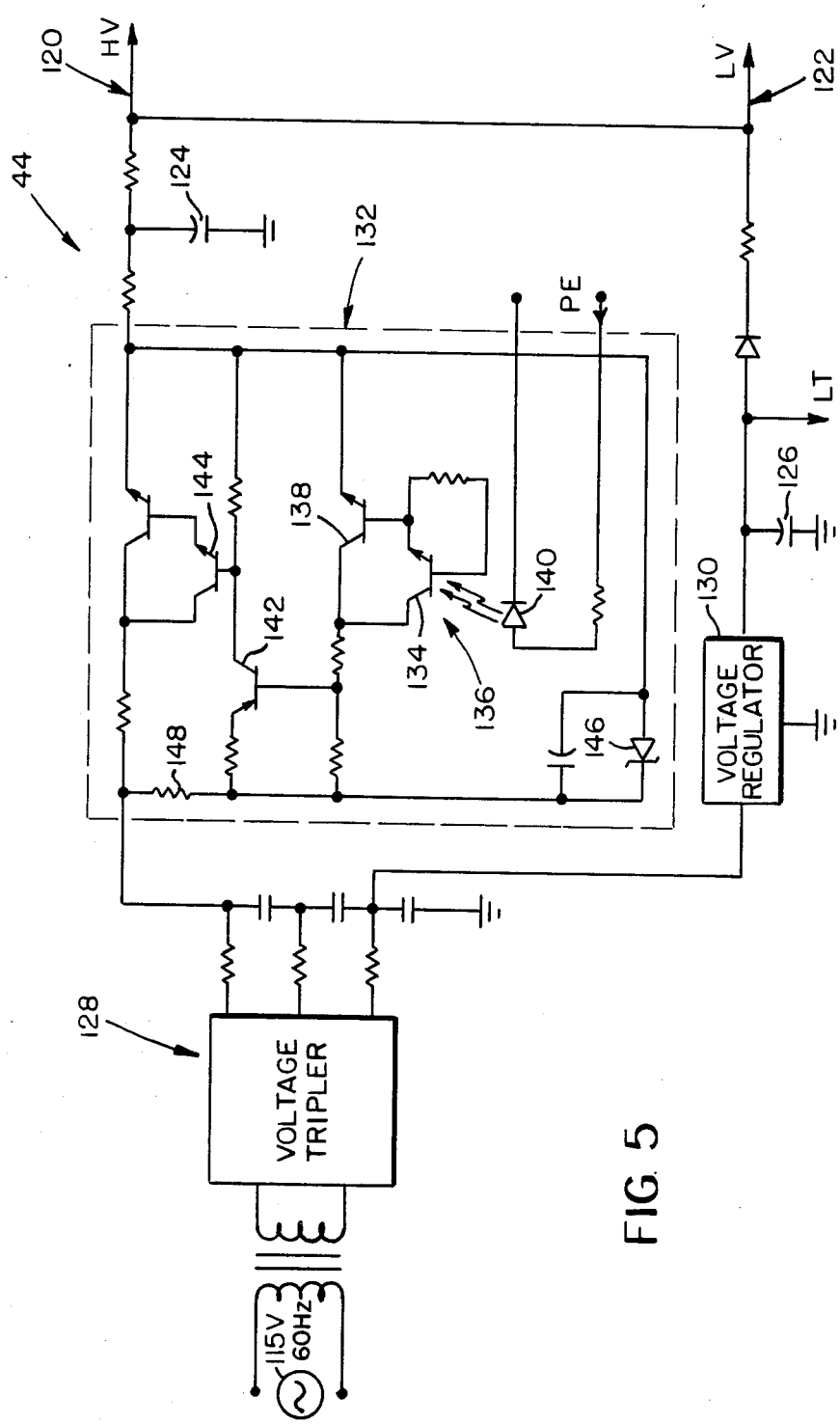
FIG. 5 is a circuit schematic, partially in block diagram form, of a high-voltage power supply portion of the electronic strobe light.

Preferably, the power supply circuitry 44 is arranged to limit the amount of power consumed with each firing operation of the flash tube 30. For that purpose, the power supply circuitry 44, as shown in FIG. 5, includes a high voltage output portion 120, and a low voltage output portion 122. The high voltage portion 120 provides a voltage, HV, that is sufficiently high to ignite an arc in the flash tube 30 in response to a flash tube triggering operation, i.e. when its gas is only partially ionized. For that purpose, a relatively small capacitor 124 is chargeable to between 400 and 550 volts.

The low voltage portion 122 provides a regulated voltage, LV, that is less than the minimum flash tube ignition voltage, but which is adequate to produce light when the flash tube 30 is already well ionized. For that purpose, a relatively large capacitor 126, approximately 2200 microfarads ($\mu f$), is chargeable to approximately 120 volts. As shown, the capacitor 126 also serves to supply the operating voltage LT, for the flash tube trigger circuit 45.

A conventional voltage tripler circuit 128, connected to a 115-volt source of line voltage, provides the necessary voltage for charging the capacitors 124 and 126 to their respective levels. A conventional voltage regulator 130, connected to the low-voltage output of the tripler circuit 128, serves to maintain the charge of the capacitor 126 at its regulated 120-volt level. Because the low and high voltage portions 120 and 122 are connected in parallel to ground, the capacitor 124 is quiescently charged to 120 volts as the capacitor 126 is charged.

The charging of the capacitor 124, on the other hand, beyond the 120 volts of the capacitor 126 occurs only when the flash tube 30 is to be triggered. For that purpose, switching circuitry, denoted generally 132 and responsive to the power supply enable signal PE, is provided for coupling the high voltage output of the tripler 128 to the capacitor 124.

A phototransistor 134 of an electro-optical coupler 136 supplies drive current to a transistor 138 when the power enable signal PE energizes an LED 140. A transistor 142, in response to the turning on of the transistor 138, provides base drive current to the input of a Darlington stage 144. The Darlington stage 144 applies the high voltage output of the tripler 128 to the capacitor 124.

A zener diode 146, serially connected to the capacitor 124 through a current-limiting resistor 148, provides operating voltage for the switching circuitry 132. The resistor 148 is relatively large, to limit leakage current through the zener diode 146, so that high-voltage charging of the capacitor 124 occurs in response to the power supply enable signal PE.

In view of the foregoing, the operation of the film video player 10 with the electronic strobe light 12 will now be described with particular reference to FIGS. 3 through 6 of the drawings.

During readout of the image sensor 20, the flash-firing control signal OI, which is provided by the illumination logic circuitry 40, is low. The signal OI is applied through the CMOS buffers 90 to the gate of the MOSFET 84, thereby turning off the MOSFET and preventing sensor-illuminating light from the flash tube 30. The capacitor 126 of the low voltage portion 122 of the power supply circuitry 44, and a trigger capacitor 150 of the flash trigger circuit 45, are charged during this period.

Figure 6:
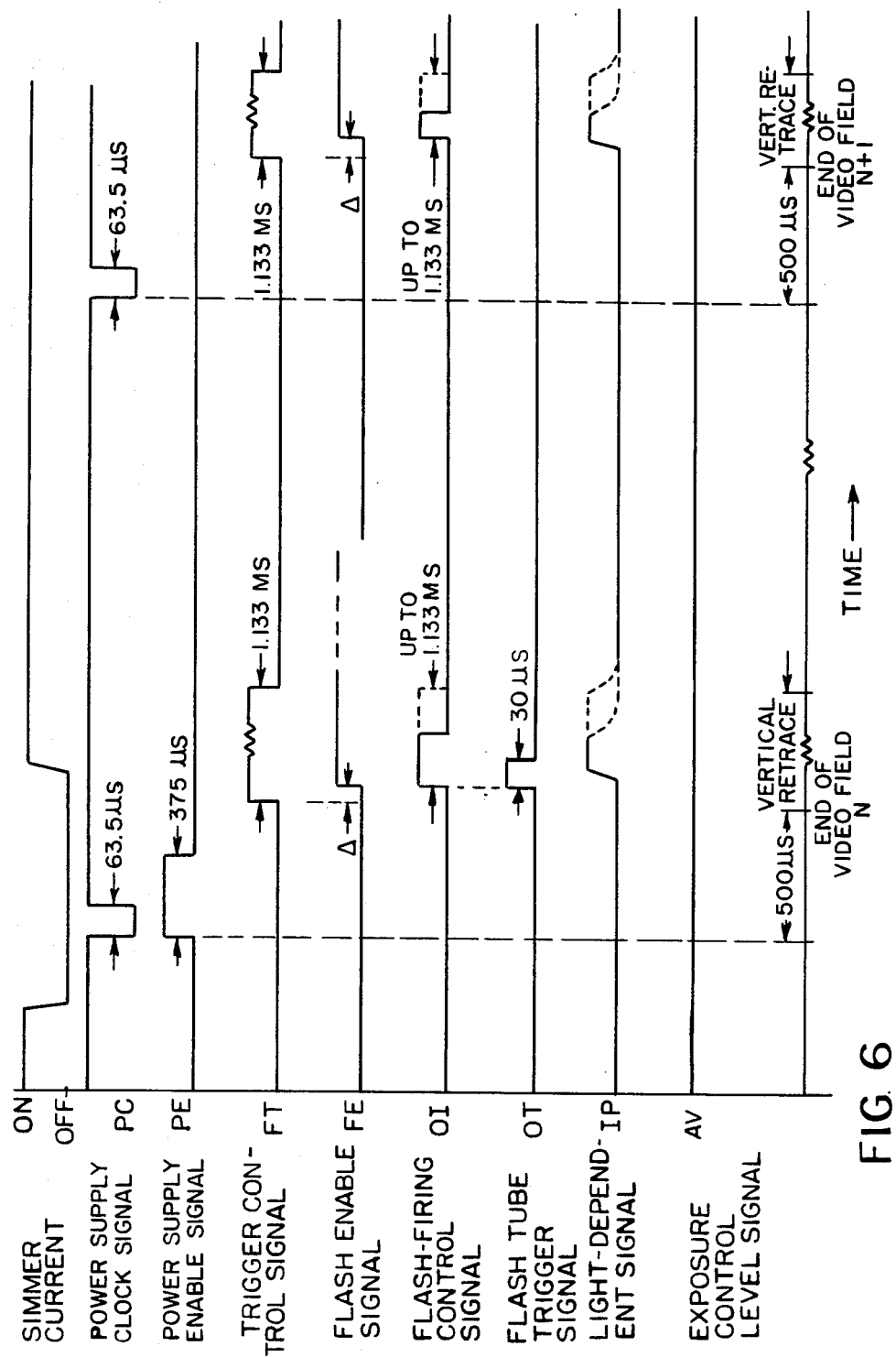
FIG. 6 is a timing diagram of various signal waveforms of the film video player.

While the image sensor 20 is read out, assume that the flash tube simmer current inadvertently turns off, as illustrated in FIG. 6. As the simmer current turns off, the voltage across the flash tube 30 rises rapidly towards the voltage across the capacitor 126 (120 volts). This causes the voltage at the junction 76 to fall rapidly, from approximately 60 volts to about 15 volts. When that happens, forward bias is removed from the transistor 71 of the ionization sense circuitry 50. With the transistor 71 off, the voltage IS drops, from a normally high level equal to the zener voltage of the diode 78, to ground. This causes the inverter 101 to enable the one-shot 100 of the illumination logic circuitry 40.

As is also shown in FIG. 6, approximately 500 μs before the end of the readout of a video field, before the vertical retrace interval of a standard video signal, the power supply clock signal PC, which is provided by the clock generator and signal processing electronics 22, goes low momentarily (approximately 63.5 μs). With the one-shot 100 enabled, the one-shot 100 produces the power supply enable signal PE in response to the negative-going transition of the signal PC.

The signal PE, which is approximately 375 μs long, is applied along one path to the power supply circuitry 44. In response to the signal PE, the Darlington stage 144 of the switching circuitry 132 turns on, thereby causing the high voltage output of the voltage tripler 128 to charge the capacitor 124. Because the latter is relatively small, approximately 0.47 μf, the capacitor 124 charges to approximately 550 volts prior to the termination of the power supply enable signal PE, which occurs prior to the end of the readout of the video field.

The signal PE is applied along a second path to the latch 102. In response to the negative-going transition of the signal PE, the latch 102 produces a logic level one output voltage, which enables the one-shot 114.

By means of electronic switching means (not shown), connected to the output of the integrator and responsive to the signal PC assuming a low level condition, the output of the integrator 116 is initialized to zero. With the output of the integrator 116 below the exposure control level signal AV, the output of the comparator 118 is high, which enables the one-shot 106.

At the end of the readout of the video field, and therefore at the beginning of the vertical retrace interval, the trigger control signal FT, which is also provided by the clock generator and signal processing electronics 22, goes high for 1.133 ms. The AND gates 104 and 108 are therefore enabled at the start of the vertical retrace interval.

At the end of the video field, the control system 26, with inputs provided by the detector 28, provides the exposure control level signal AV via the D/A converter 42. When a flash pulse is desired, the flash enable signal FE, also under the control of the control system 26, is applied to the AND gate 104. The signal FE has a delay, Δ, relative to the trigger control signal FT, because of the real time calculation of the signal AV by the microprocessor of the control system 26. With the one-shot 106 enabled, the gate 104, in response to the signal FE, causes the output of the one-shot 106 to go high. The AND gate 108 receives the output of the one-shot 106, and produces a logic level one output.

In response to the positive-going transition at the output of the AND gate 108, the one-shot 114 produces the flash tube trigger signal OT. In synchronism with the producing of the signal OT, the buffer 112 receives the output of the AND gate 108, and produces the flash-firing control signal OI. Thus, when the flash tube simmer current is off, the flash trigger circuit 45 is activated in synchronism with the turning on of the power MOSFET 84 of the flash-firing current driver circuitry 52.

In response to the flash tube trigger signal OT, the trigger capacitor 150 discharges, which causes a very high trigger electrode voltage to be produced across the output coil of the trigger transformer 152. The trigger electrode voltage momentarily partially ionizes at least some of the gas in the flash tube 30.

This partial ionization of the gas lowers the impedance of the flash tube 30. With the MOSFET 84 on, the high voltage portion 120 of the power supply circuitry 44 discharges through the flash tube 30 to ground. This high voltage discharge reignites an arc in the flash tube 30, and thereby restarts the simmer current through the simmer current driver circuitry 48.

The high voltage capacitor 124 discharges rapidly to a voltage equal to the voltage that is across the capacitor 126 of the low voltage portion 122 of the power supply circuitry 44. At that time, the low voltage portion 122 of the power supply circuitry 44 takes over, and supplies the bulk of the remaining flash-firing power to the flash tube 30, whereby its light output is maintained at a substantially constant level for the duration of the flash-firing operation by the current driver circuitry 52.

The photosensor 38 senses flash light reflected from the diffuser 36, and supplies its light-dependent signal IP to the integrator 116. The output of the integrator 116 rises steadily. The output of the comparator 118 goes low when the output of the integrator 116 rises to the exposure level control signal AV. In response the negative-going transition at the output of the comparator 118, the output of the one-shot 106 goes low, thereby driving the output of the AND gate 108 low.

In response to the negative-going transition at the output of the gate 108, the output of the latch 102 returns to a logic zero level. Additionally, the output signal OI of the buffer 112 goes low, thereby turning off the power MOSFET 84 and extinguishing the illuminating of the film 14 and the image sensor 20.

The simmer current driver circuitry 48, however, remains unaffected by the turning off of the MOSFET 84. The circuitry 48 continues to conduct simmer current, thereby maintaining the arc of the flash tube 30, at a level which is insufficient to smear the image signal during the readout of the image sensor 20. At that level of flash tube current, the voltage at the junction 76 holds at about 60 volts, which maintains the transistor 71 of the ionization sense circuitry 50 on. Thus, the voltage IS remains high, which prevents the output of the inverter 101 from enabling the one-shot 100 for the next PC pulse.

Assume that the simmer current stays on, as is also shown in FIG. 6. Again, about 500 $\mu$s before the end of the next video field, the clock power signal PC goes low. As with the previous video field, this sets the output of the integrator 116 low, which returns the output of the comparator 118 high, thereby enabling the one-shot 106.

This time, however, without the one-shot 100 in an enabled condition, the negative-going transition of the signal PC has no effect on the output of the one-shot 100. In the absence of the power supply enable signal PE, the high voltage portion 120 of the power supply circuitry 44 remains at 120 volts, and the output of the latch 102 stays at a logic zero level, thereby holding the one-shot 114 in its reset condition.

When both the trigger control voltage signal FT and the flash enable signal FE are high during the next vertical retrace interval, the output of the one-shot 106 goes high in response to the positive-going transition at the output of the AND gate 104. The AND gate 108 receives the output of the one-shot 106, and produces a logic one level output. This time, however, the output of the AND gate 108 has no effect on the output of the one-shot 114 as the latter is held off by the latch 102. In the absence of the flash tube trigger voltage OT, the flash tube trigger circuit 45 stays off, and the high voltage trigger electrode signal is not produced. The buffer 112, however, still receives the output of the AND gate 108, and produces the flash-firing control signal OI.

With an arc in the flash tube 30 due to the simmer current, the low voltage portion 122 of the power supply circuitry 44 immediately provides current to the flash tube as the result of the turning on of the power MOSFET 84. The duration of the flash-firing current through the flash tube 30 is controlled by the operation of the integrator 116 in response to the light-dependent signal IP, as described with regard to the flash-firing operation for the previous vertical retrace interval.

The above-described flash-firing sequences are repeated during each vertical retrace interval of a standard television signal that a flash pulse is desired, depending upon whether or not a flash tube simmer current is on. By providing for the triggering of the flash tube 30 only when the simmer current is off, the potentially adverse effects of electromagnetic interference that the high trigger electrode voltage can produce, are minimized. Additionally, with the power supply circuitry 44 having a first, high voltage portion for reigniting the flash tube arc, and a second, lower voltage portion that is adequate for firing the flash tube when an arc is present, further reductions in the level of electromagnetic interference are achieved by operating the high voltage portion only when the arc is extinguished.

The invention has been described in detail with reference to the figures, however, it will be appreciated that variations and modifications are possible within the spirit and scope of the invention.

What is claimed is:

1. In a film video player having an electronic strobe light including a flash tube trigger circuit operable for repetitively triggering a flash tube into conduction, for flash illuminating a solid stage image sensor by way of a pulse of high-intensity light projected onto a photographic film at the vertical retrace rate of a standard television signal, the improvement comprising:
    (a) circuit means for drawing a flash tube simmer current, to maintain an arc in the flash tube between light pulses;
    (b) sensing circuitry arranged for producing a control signal corresponding to whether or not said flash tube is conducting simmer current; and
    (c) switching circuitry, operable at the vertical retrace rate in response to the control signal, (1) for causing the overriding of the operation of said flash tube trigger circuit when the control signal indicates that said flash tube is conducting simmer current, and (2) for causing the operation of said flash tube trigger circuit when the control signal indicates that said flash tube is not conducting simmer current.

2. A film video player as defined in claim 1 wherein said image sensor produces a video signal corresponding to the film image, and wherein said circuit means is arranged for limiting the simmer current, to produce an arc which avoids the smearing of the image signal during its readout from said image sensor.

3. A film video player as defined in claim 2 wherein said circuit means is arranged to limit the simmer current to a predetermined level.

4. A film video player as defined in claim 2 wherein said simmer current circuit means is serially connected to said flash tube, and said sensing circuitry, in response to a voltage at the junction common to said flash tube and said circuit means, produces its control signal.

5. A film video player as defined in claim 4 wherein said sensing circuitry includes a switching transistor having an input responsive to the voltage at said junction, and an output connected to ground through a zener diode, which produces the control signal in accordance with the condition of said switching transistor.

6. In a film video player having an electronic strobe light for flash illuminating a solid state image sensor via a pulse of high-intensity light projected onto a photographic film at the vertical retrace rate of a standard television signal, said electronic strobe light including a flash tube, a trigger circuit operable for ionizing gas in said flash tube, a first voltage source, operative in response to the ionization of flash tube gas, for applying to said flash tube a first firing voltage, which is greater than the minimum ignition voltage of said flash tube, to ignite an arc in said flash tube, and a second voltage source for applying to said flash tube a second firing voltage, which is less than the minimum ignition voltage of said flash tube, but which is adequate, when an arc is present, to cause the illumination of said image sensor, the improvement comprising:

(a) circuit means for drawing a flash tube simmer current, to maintain an arc in the flash tube between sensor-illuminating light pulses;

(b) sensing circuitry arranged for producing a control signal corresponding to whether or not said flash tube is conducting simmer current; and (c) switching circuitry, operable at the vertical retrace rate in response to the control signal, (1) for causing, when the control signal indicates that said flash tube is conducting simmer current, the operation of said second voltage source, while overriding the operation of said trigger circuit and, therefore, the overriding of the operation of said first voltage source, and (2) for causing, when the control signal indicates that said flash tube is not conducting simmer current, the operation of said trigger circuit.

7. A film video player as defined in claim 6 wherein said first voltage source includes a capacitor chargeable to the first firing voltage, and wherein said switching circuity operates to cause charging of said capacitor prior to each vertical retrace interval when the control signal indicates that the simmer current is off.

8. A film video player as defined in claim 7 wherein said switching circuitry operates in timed relation to the control signal to terminate the charging of said capacitor immediately prior to each vertical retrace interval.

* * * * *